(12) United States Patent
Bealkowski et al.

(10) Patent No.: US 9,208,072 B2
(45) Date of Patent: Dec. 8, 2015

(54) FIRMWARE STORAGE AND MAINTENANCE

(71) Applicant: Lenovo Enterprise Solutions (Singapore) Pte. Ltd., Singapore (SG)

(72) Inventors: Richard Bealkowski, Redmond, WA (US); Michael R. Turner, Monroe, WA (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 310 days.

(21) Appl. No.: 13/926,249

(22) Filed: Jun. 25, 2013

(65) Prior Publication Data

US 2014/0379957 A1    Dec. 25, 2014

(51) Int. Cl.
  *G06F 12/02*    (2006.01)
  *G06F 9/445*    (2006.01)

(52) U.S. Cl.
  CPC ............ *G06F 12/0246* (2013.01); *G06F 8/665* (2013.01)

(58) Field of Classification Search
  None
  See application file for complete search history.

(56) References Cited

U.S. PATENT DOCUMENTS

| | | | |
|---|---|---|---|
| 7,240,188 B2 | 7/2007 | Takata et al. | |
| 7,293,165 B1 | 11/2007 | Tobias | |
| 7,447,846 B2 | 11/2008 | Yeh | |
| 7,870,312 B2 | 1/2011 | Thomas | |
| 8,082,470 B2 | 12/2011 | Rothman et al. | |
| 2005/0114554 A1 | 5/2005 | Azadet et al. | |
| 2007/0169098 A1 | 7/2007 | Kikuchi | |
| 2009/0260001 A1 | 10/2009 | Park et al. | |
| 2011/0283274 A1 | 11/2011 | Krzyzanowski et al. | |
| 2012/0324246 A1 | 12/2012 | Rahardjo et al. | |
| 2014/0208000 A1* | 7/2014 | Phelan et al. | ............... 711/103 |
| 2015/0169447 A1* | 6/2015 | Stultz et al. | ......... G06F 12/0646 |

OTHER PUBLICATIONS

U.S. Appl. No. 13/939,702.

* cited by examiner

*Primary Examiner* — Denise Tran
(74) *Attorney, Agent, or Firm* — Katherine S. Brown; Jeffrey L. Streets (57) ABSTRACT

A mechanism is provided for improved firmware storage and maintenance. For each master device in a plurality of master devices: an amount of flash memory space required by the master device is identified and the amount of Flash memory space from a Flash component is allocated to the master device as a virtual Flash memory allocation. An initial sector location of the virtual Flash memory allocation in a data structure is recorded as an offset into the Flash component and a length of the virtual Flash memory allocation and device information is also recorded in the data structure. Data that allows the master device to boot up is then loaded into the virtual Flash memory allocation.

12 Claims, 5 Drawing Sheets

FIRMWARE STORAGE AND MAINTENANCE

BACKGROUND

The present application relates generally to an improved data processing apparatus and method and more specifically to mechanisms for improving firmware storage and maintenance.

Current servers comprise numerous subsystems, with many of those subsystems using stored code such as firmware, microcode, or the like. Typically, each subsystem has its own storage component (e.g., a Flash memory component) for its corresponding firmware, microcode, or the like. Having an independent storage component may also be true for expansion or add-on devices, such as adapter cards, which may also be known as mezzanine cards or expansion cards.

For example, a server may have one Flash memory component to hold the primary firmware for the data processing system. The contents of this primary firmware may include Platform Initialization (PI) code, Unified Extensible Firmware Interface (UEFI) code, Basic Input Output System (BIOS) code, or the like. The server may also have a network controller with its own Flash memory component containing firmware code. Firmware is simply considered as a collection of applicable code or codes. The server may also have a disk controller with its associated Flash memory component for firmware storage.

This arrangement of subsystems each with individual Flash memory components is costly in component costs, board area costs, and a need to separately maintain the contents of each of the Flash memory components present within the data processing system. The component costs and board costs represent an initial fixed cost increasing the overall cost of the server. The additional hardware devices also contribute to the likelihood of a hardware failure (mean time between failures (MTBF) calculations), thus raising the initial cost of the server and impacting future warranty costs. The maintenance of the contents of the Flash memory components represents an initial cost to create the management software(s). There is also the cost of upkeep of the various management software(s). Finally, there is the cost incurred by the customer to have trained personnel to operate the management software (s), the overall time consumed during the maintenance (e.g. update actions, and the cost of the loss of use of the server during at least parts of the maintenance action. Furthermore, with multiple firmware images existing within the individual Flash memory components each identified by their own versioning means, the server is never at a single known code level. Rather, the server is at a collection of various code levels, resulting in complicated maintenance and updating of the server.

SUMMARY

In one illustrative embodiment, a method, in a data processing system, is provided for improved firmware storage and maintenance. For each master device in a plurality of master devices, the illustrative embodiment identifies an amount of Flash memory space required by the master device. The illustrative embodiment allocates the amount of Flash memory space from a Flash component to the master device as a virtual Flash memory allocation. The illustrative embodiment records an initial sector location of the virtual Flash memory allocation in a data structure as an offset into the Flash component. The illustrative embodiment records a length of the virtual Flash memory allocation in the data structure. The illustrative embodiment loads data that allows the master device to boot up into the virtual Flash memory allocation.

In other illustrative embodiments, a computer program product comprising a computer useable or readable medium having a computer readable program is provided. The computer readable program, when executed on a computing device, causes the computing device to perform various ones of, and combinations of the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide for improving firmware storage and maintenance through eliminating multiple separate Flash memory components. In the illustrative embodiments, a single Flash memory component is used and the single Flash memory component is subdivided or partitioned to meet the requirements of the individual subsystems of the data processing system. The illustrative embodiments provide a new aggregation mechanism to present individualized "virtual" Flash memory components to the subsystems. Thus, each subsystem recognizes the "virtual" Flash memory components as a separate dedicated Flash memory component and all current hardware-level and software-level operations continue to function in a compatible fashion as if the subsystem had its own Flash memory component. By providing a single Flash memory component, the illustrative embodiment may manage firmware for the entire data processing system, i.e., all subsystems, as a single entity. That is, with the single entity approach, only one image needs to be posted at a service location on the web, the server can be identified with a single code version value, and only one update software utility is required.

Figure 1:
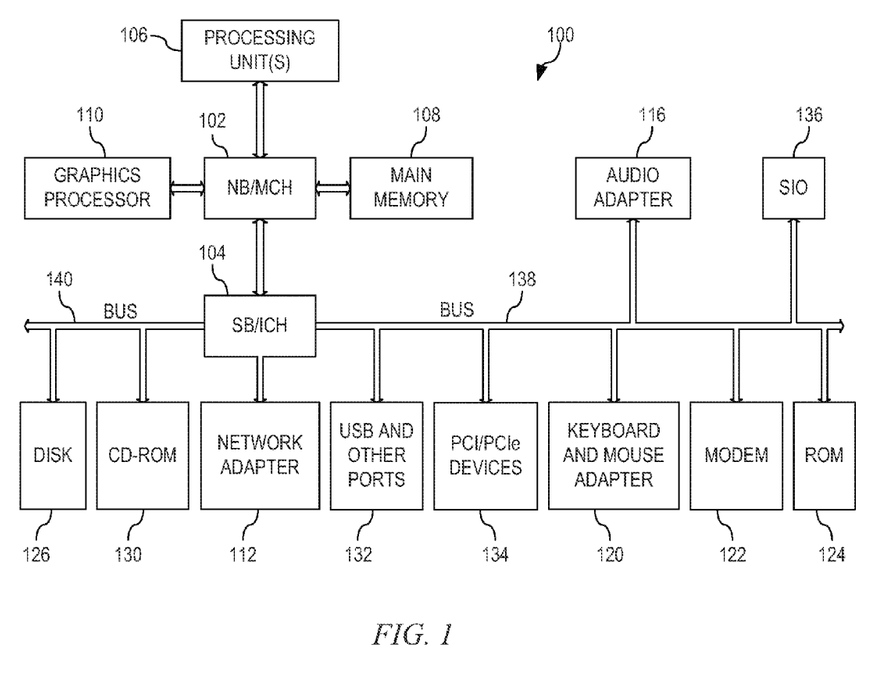
FIG. 1 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIG. 1 is provided hereafter as example environments in which aspects of the illustrative embodiments may be implemented. It should be appreciated that FIG. 1 is only examples and are not intended to assert or imply any limitation with regard to the environments in which aspects or embodiments of the present invention may be implemented. Many modifications to the depicted environments may be made without departing from the spirit and scope of the present invention.

FIG. 1 is a block diagram of an example data processing system in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 100.

As a server, data processing system 100 may be, for example, an IBM® eServer™ System p® computer system, running the Advanced Interactive Executive (AIX®) operating system or the LINUX® operating system. Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device that is configured with flash memory to provide non-volatile memory for storing operating system files and/or user-generated data, for example. Essentially, data processing system 100 may be any known or later developed data processing system without architectural limitation.

Again, the illustrative embodiments improve firmware storage and maintenance within a data processing system, such as data processing system 100 of FIG. 1, by eliminating multiple separate Flash memory components and providing a single Flash memory component that is subdivided or partitioned to meet the requirements of the individual subsystems of the data processing system. By providing an individualized "virtual" Flash memory components each subsystem, each subsystem recognizes the "virtual" Flash memory components as a separate dedicated Flash memory component and all current hardware-level and software-level operations continue to function in a compatible fashion as if the subsystem had its own Flash memory component. The single entity Flash memory component enables simplified server maintenance. That is, with the single entity approach, only one image needs to be posted at a service location on the web, the Server can be identified with a single code version value, and only one update software utility is required.

Figure 2:
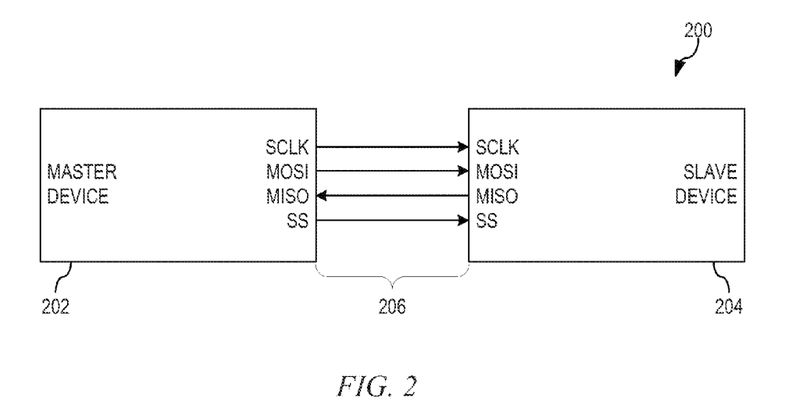
FIG. 2 depicts an example of a master-slave interconnect in accordance within an illustrative embodiment.

FIG. 2 depicts an example of a master-slave interconnect in accordance within an illustrative embodiment. In data processing system 200, master device 202 represents a host computing device, network controller, disk controller, or the like, and slave device 204 represents a Flash memory component. As is illustrated, master device 202 is coupled to slave device 204 via a Serial Peripheral Interface (SPI) interface 206, which is a four-wire serial bus; however, other coupling configurations are also utilized, such as a parallel implementation, and the SPI interface is utilized herewith only for illustrative purposes. The four signals of SRI interface 206 are:

SCLK: serial clock (output from master),
MOSI: master output, slave input (output from master)
MISO: master input, slave output (output from slave)
SS: slave select (active low, output from master)

Figure 3:
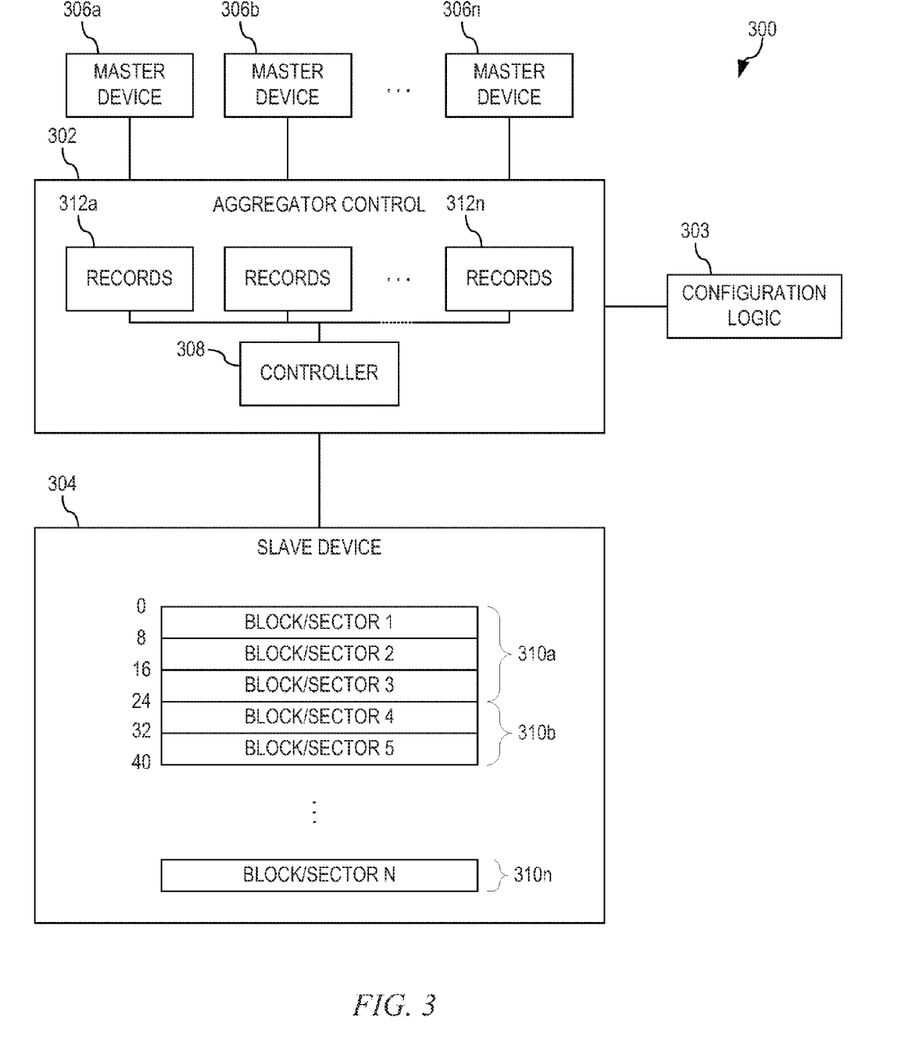
FIG. 3 depicts an aggregation mechanism for improving firmware storage and maintenance by eliminating multiple separate Flash memory components in accordance with an illustrative embodiment.

FIG. 3 depicts an aggregation mechanism for improving firmware storage and maintenance by eliminating multiple separate Flash memory components in accordance with an illustrative embodiment. Data processing system 300 comprises aggregator control 302, configuration logic 303, slave device 304 that represents a Flash memory component, and a set of master devices 306a-306n that represent devices, such as a host computing device, network controller, disk controller, or the like.

During initialization of data processing system 300, configuration logic 303 initializes Flash memory allocations for those ones of master device 306a-306n that will initially be provisioned within data processing system 300. Upon identifying which ones of master device 306a-306n will initially be provisioned within data processing system 300, configuration logic 303 identifies a requested amount of Flash memory space needed by each master device as well as the data that will be loaded into the allocated Flash memory space after allocation. Once this information is identified, configuration logic 303 sends a request for Flash memory allocation for each of those master devices to aggregator control 302. Each request includes a requested amount of Flash memory space for the particular master device. Aggregator control 302 comprises controller 308 that manages allocation of Flash memory space for and access of master devices 306a-306n to slave device 304. Upon receiving each request, controller 308 allocates the requested amount of Flash memory space within slave device 304 for the master device as a virtual Flash memory allocation. Controller 308 then records the initial sector location of the virtual Flash memory allocation as an offset into slave device 304 as well as a length of the virtual Flash memory allocation. Controller 308 may also record information related to slave device 304 itself, such as a manufacturer device identifier of stave device 304 and other virtual values associated with Flash commands that are supported by slave device 304.

That is, slave device 304 operates on the basis of internal "sectors" and/or "blocks." In accordance with the illustrative embodiments, one or more of these sectors or blocks are assigned to each master device in master devices 306a-306n as a virtual Flash memory. Thus, for example, slave device 304 may be organized into 8K blocks with virtual Flash memory 310a being assigned to master device 306a. Further, since master device 306a is configured with virtual Flash memory 310a, which is three 8K blocks or 24K, then master device 306b, which has been assigned virtual Flash memory 310b, accesses virtual Flash memory 310b at an offset of 24K, as exemplified. As illustrated, virtual Flash memory 310b is two 8K blocks or 16K, which means that virtual Flash memory 310b starts at 24K and extends for 16K up to 40K. (Note: zero based addressing means up to but not including 40K.) Similar virtual Flash memory allocation are made to all of master devices 306a-306n, with the last illustrated allocation being virtual Flash memory 310n being assigned to master device 306n, which is one 8K block. As is illustrated, controller 308 stores records 312a-312n, with each record in records 312a-312n tracking information such as an offset into the slave, block allocation, or the like.

Aggregator control 302 then sends an acknowledgment of the allocation of Flash memory space within slave device 304 to configuration logic 303. Upon receiving the acknowledgement, configuration mechanism 303 loads the allocated Flash memory space within slave device 304 with data related to the associated master device so that, when the master device powers up, the master device will immediately be able to access its data within slave device 304 via aggregator control 302. That is, controller 308 biases inbound addresses for or from one or more of master devices 306a-306n based on a location of a virtual Flash memory within slave device 304 that is assigned to each particular master device. Thus, since master device 306a is configured with virtual Flash memory 310a, which is three 8K blocks or 24K and since virtual Flash memory 310a starts at 0, controller 308 does not offset operations for or from master device 306a but does limit access to 24K of capacity. Additionally, since virtual Flash memory 310b is two 8K blocks or 16K, which means that virtual Flash memory 310b starts at 24K and extends for 16K up to 40K, controller 308 offsets all operations for or from master device 306b by 16K and limits access to 16K of capacity.

After data processing system 300 has been put into production, in accordance with the illustrative embodiments, slave device 304 supports a number of commands, such as read, write, erase, information, or the like. For read and write commands, controller 308 issues a read or a write received from one of master devices 306a-306n to slave device 304 based on the offset associated with the requesting master device and its allocated virtual Flash memory.

The information command causes slave device 304 to return items such as manufacturer ID, type, and capacity. Continuing with the example, when a master device, such as master device 306b issues an information command, controller 308 returns a capacity of 16K. Thus, rather than slave device 304 retuning the entire capacity of slave device 304, controller 308 only returns the allocated portion of slave device 304. Therefore, controller 308 processes all commands from master devices 306a-306n that include an address component utilizing the appropriate offset and limit based on allocated capacity.

As a distinction from currently implemented Flash component implementations, controller 308 does not always allow commands such as chip erase. Instead, when controller 308 receives an erase command from one of master devices 306a-306n, controller 308 translates the erase command only to the allocated memory portion of slave device 304 that correlates to the requesting memory device. That is, when an erase command is received from, for example, master device 306a, then controller 308 would issue a command to erase data of three 8K blocks starting at offset 0. It should be noted that, when master device 306a issues a erase command, master device 306a issues the command as a chip erase even though controller 308 emulates the chip erase command as a block erase command so that only the blocks allocated to master device 306a are actually erased. Thus, from a perspective of master device 306a a full chip erase is being performed of the virtual Flash memory allocation, even though controller 308 is emulating a chip erase function via one or more block erase actions.

Thus, controller 308 allows each individual one or master devices 306a-306n to read, write, or perform an emulated block erase only (i.e., no chip erase) within their own allocated virtual Flash memory as well as emulating any information queries based on an associated offset. The illustrative embodiments refer to this operating mode as a compatibility mode. However, in accordance with the illustrative embodiments, controller 308 also provides a single entity mode and a restrictive mode.

In the single entity mode, controller 308 specifies one of master devices 306a-306n as a "System Owner." When one of master devices 306a-306n is specified as a "System Owner," controller 308 grants the "System Owner" full access to slave device 304. By granting full access, the "System Owner" designated master device is able to completely alter the entire slave device 304. This is useful when an implementation of data processing system 300 as a whole shifts from update software for each of master devices 306a-306n with the associated separate images to a single unified system image. When this occurs, various individual update utilities are no longer needed by each master device 306a-306n and the "System Owner" designated master device updates the consolidated image of all master devices 306a-306n. Thus, in the single entity mode, controller 308 allows only the "System Owner" designated master device to read, write, perform a block erase, and/or perform a chip erase, as well as receiving direct information queries from slave device 304. Controller 308 may also grant configuration logic 303 "System Owner" capabilities.

In the restrictive mode, one or more of master devices 306a-306n is restricted in its ability to perform any operation that may alter its allocated virtual Flash memory. That is, in the restrictive modes, controller 308 allows the restricted master device to read from its allocated virtual Flash memory as well as emulating any information queries based on an associated offset. However, controller 308 prevents the restricted master device from writing, performing a block erase, and performing a chip erase.

Regardless of the mode of a master device, more than one of master devices 306a-306n may access slave device 304 at a time. This is especially important during system power up where each master device will likely be initializing and loading its associated code and data from its virtual Flash memory. Controller 308 sequences each request from master devices 306a-306n to ensure equal access in a timely fashion.

In addition to providing initial configuration for those one of master devices 306a-306n that will initially be provisioned within data processing system 300, configuration logic 303 also provides configuration assistance for those ones of master devices 306a-306n that are added to data processing system 300 after data processing system 300 has been deployed. That is, if a master device, which needs an allocation of Flash memory space within slave device 304, is coupled to data processing system 300 in an event, such as through hot-plugging, configuration logic 303 and/or aggregator control 302 determines whether the new allocation of Flash memory space may be supported by slave device 304. If slave device 304 is not able to support the Flash memory space allocation, configuration logic 303 and/or aggregator control 302 sends a notification to the user indicating that the Flash memory space from slave device 304 cannot be allocated. Note that, if slave device 304 is not able to support the Flash memory space allocation, the additional master device may choose to include its own local Flash storage separate and independent from utilizing the virtual Flash capabilities of slave device 304 or as a backup mechanism for when the slave device 304 cannot accommodate additional master device requirements.

If slave device 304 is able to be supported, configuration logic 303 identifies a requested amount of Flash memory space needed by the added master device as well as the data that will be loaded into the allocated Flash memory space after allocation. Once this information is identified, configuration logic 303 sends a request for Flash memory allocation for each of those master devices to aggregator control 302, the request including the requested amount of Flash memory space. Upon receiving each request, controller 308 within aggregator control 302 allocates the requested amount of Flash memory space within slave device 304 for the master device as a virtual Flash memory allocation. Controller 308 then records the initial sector location of the virtual Flash memory allocation as an offset into slave device 304 as well as a length of the virtual Flash memory allocation. Aggregator control 302 then sends an acknowledgment of the allocation of Flash memory space within slave device 304 to configuration logic 303. Upon receiving the acknowledgement, configuration logic 303 loads the allocated Flash memory space within slave device 304 with data related to the master device so that the master device will immediately be able to access its data within slave device 304 via aggregator control 302.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, pure signal or propagation wave per se. A non-transitory computer readable medium may utilize signals and propagation waves, hut is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart, and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
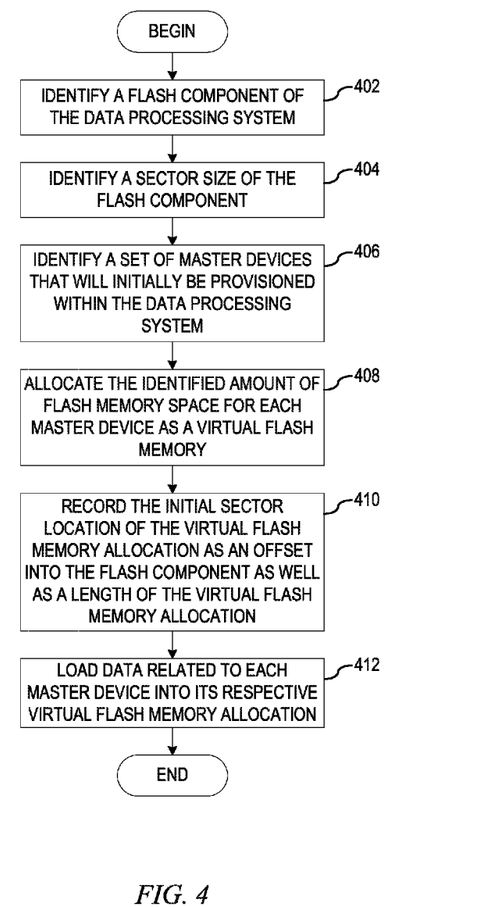
FIG. 4 depicts a flowchart for an operation performed by an aggregation mechanism in initial allocation of virtual Flash memory in accordance with an illustrative embodiment.

FIG. 4 depicts a flowchart for an operation performed by an aggregation mechanism in initial allocation of virtual Flash memory in accordance with an illustrative embodiment. As the operation begins, the aggregation mechanism within a data processing system identifies a Flash component of the data processing system (step 402). The aggregation mechanism then identifies a sector size of the Flash component (step 404). The aggregation mechanism identifies a set of master devices that will initially be provisioned within the data processing system (step 406). For each master device in the set of master devices, the aggregation mechanism allocates the identified amount of Flash memory space for each master device as a virtual Flash memory allocation (step 408). The aggregation mechanism then records the initial sector location of the virtual Flash memory allocation as an offset into the Flash component as well as a length of the virtual Flash memory allocation (step 410). The aggregation mechanism then loads data related to each master device into its respective virtual Flash memory allocation so that, when the master device powers up, the master device will immediately be able to access its data within the Flash component (step 412), with the operation ending thereafter.

Figure 5:
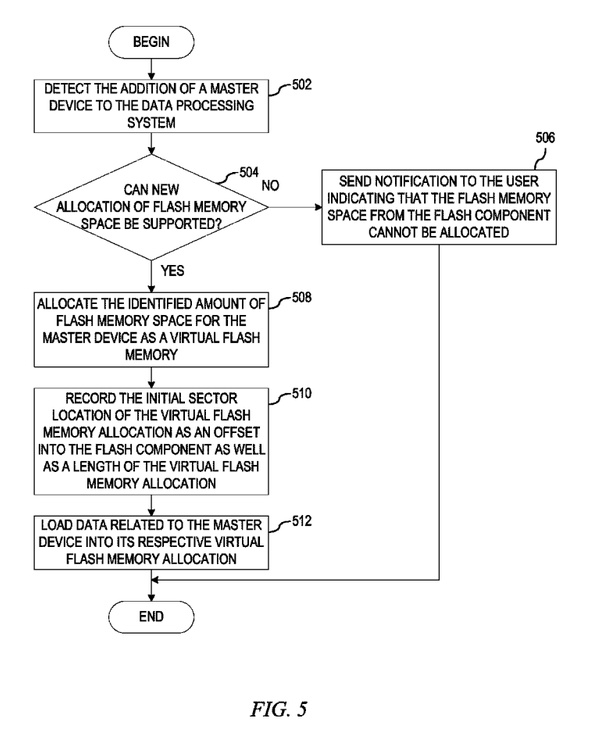
FIG. 5 depicts a flowchart for an operation performed by an aggregation mechanism in allocating virtual Flash memory in response to an event in accordance with an illustrative embodiment.

FIG. 5 depicts a flowchart for an operation performed by an aggregation mechanism in allocating virtual Flash memory in response to an event in accordance with an illustrative embodiment. As the operation begins, the aggregation mechanism dot-cis the addition of a master device to the data processing system (step 502). The aggregation mechanism determines whether the new allocation of flash memory space may be supported by the Flash component (step 504). If at step 504 the new allocation of Flash memory space may not be supported by the Flash component, then the aggregation mechanism sends a notification to the user indicating that the Flash memory space from the Flash component cannot be allocated (step 506), with the operation terminating thereafter.

If at step 504 the new allocation of Flash memory space is supported by the Flash component, then the aggregation mechanism allocates the identified amount of Flash memory space for the master device as a virtual Flash memory allocation (step 508). The aggregation mechanism then records the initial sector location of the virtual Flash memory allocation as an offset into the Flash component as well as a length of the virtual Flash memory allocation (step 510). In step 510, the aggregation mechanism may also record information related to the Flash component itself, such as a manufacturer device identifier of the Flash component and other virtual values associated with Flash commands that are supported by the Flash component. The aggregation mechanism then loads data, received from configuration logic, related to the master device into its respective virtual Flash memory allocation so that, when the master device powers up, the master device will immediately be able to access its data within the Flash component (step 512), with the operation ending thereafter.

Figure 6:
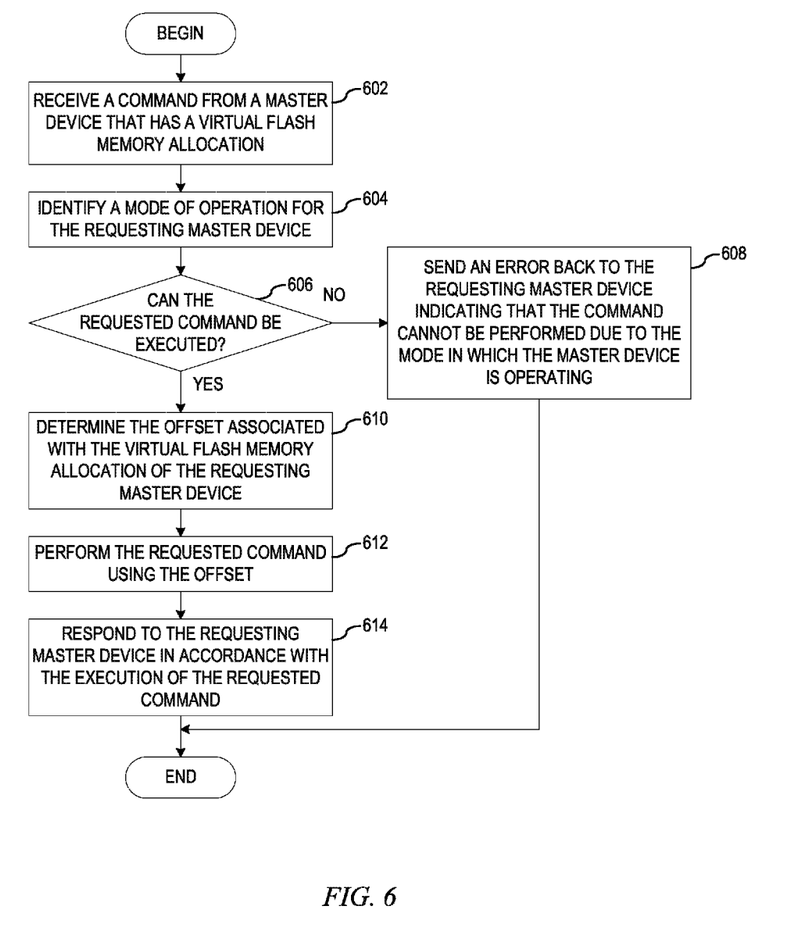
FIG. 6 depicts a flowchart for an operation performed by an aggregation mechanism in processing a command from a master device that has a virtual Flash memory allocation controlled by the aggregation mechanism in accordance with an illustrative embodiment.

FIG. 6 depicts a flowchart for an operation performed by an aggregation mechanism in processing a command from a master device that has a virtual Flash memory allocation controlled by the aggregation mechanism in accordance with an illustrative embodiment. As the operation begins, the aggregation mechanism receives a command from a master device that has a virtual Flash memory allocation (step 602). The aggregation mechanism identifies a mode of operation in which the requesting master device is operating (step 604). Based on the identified mode of operation, the aggregation mechanism determines whether the requested command can be executed (step 606). If at step 606 the aggregation mechanism determines that the requested command cannot be executed, the aggregation mechanism sends an error back to the requesting master device indicating that the command cannot be performed due to the mode in which the master device is operating (step 608), with the operation ending thereafter.

If at step 606 the aggregation mechanism determines that the requested command can be executed, the aggregation mechanism determines the offset associated with the virtual Flash memory allocation of the requesting master device (step 610). The aggregation mechanism then performs the requested command using the offset (step 612) and responds to the requesting master device in accordance with the execution of the requested command (step 614), with the operation ending thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide an aggregation mechanism for improving firmware storage and maintenance. The aggregation mechanism virtually subdivides a Flash memory component thereby providing a virtual Flash memory that looks like a real Flash component to each master device. The aggregation mechanism maps the allocated virtual Flash memory so that the master devices do not have to implement any changes in the commands that are sent. The aggregation mechanism provides multiple modes of operation while also providing a consolidated system-level firmware image instead of the prior multiple firmware image approach. By providing this a consolidated system-level firmware image, the aggregation mechanism enables a single versioning and maintenance approach by reducing the need for multiple update utilities.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer readable storage medium having a computer readable program stored therein, wherein the computer readable program, when executed on a computing device, causes the computing device to:
   for each master device in a plurality of master devices;
   identify an amount of Flash memory space required by the master device;
   allocate the amount of Flash memory space from a Flash component to the master device as a virtual Flash memory allocation;
   record an initial sector location of the virtual Flash memory allocation in a data structure as an offset into the Flash component;
   record a length of the virtual Flash memory allocation in the data structure; and
   load data that allows the master device to boot up into the virtual Flash memory allocation;
   and wherein the computer readable program further causes the computing device to:
   receive a command from one of the plurality of master devices that has a virtual Flash memory allocation;
   identify a mode of operation in which the master device is operating;
   based on the identified mode of operation, determine whether the command can be executed;
   responsive to a determination that the command can be executed, determine the offset associated with the virtual Flash memory allocation of the master device; and
   perform the command using the offset.

2. The computer program product of claim 1, wherein the computer readable program further causes the computing device to:
   responsive to a determination that the command cannot be executed, send an error back to the master device indicating that the command cannot be performed due to the mode in which the master device is operating.

3. The computer program product of claim 1, wherein the mode of operation is a compatibility mode and wherein, in the compatibility mode, the master device is able to read from the virtual Flash memory allocation, write to the virtual Flash memory allocation, perform a sector erase only within the virtual Flash memory allocation, and obtain information as to a manufacturer of the Flash component, a type of the Flash component, and a capacity of the virtual Flash memory allocation.

4. The computer program product of claim 1, wherein the mode of operation is a single entity mode and wherein, in the single entity mode, the master device is able to read from any section of the Flash component, write to any section of the Flash component, perform a sector erase within any section of the Flash component, and obtain information as to a manufacturer of the Flash component, a type of the Flash component, and a capacity of the Flash component.

5. The computer program product of claim 1, wherein the mode of operation is a restrictive mode, wherein, in the restrictive mode, the master device is able to read from the virtual Flash memory allocation and obtain information as to a manufacturer of the Flash component, a type of the Flash component, and a capacity of the virtual Flash memory allocation, and wherein, in the restrictive mode, the master device cannot alter the virtual Flash memory allocation through a write command or a erase command.

6. The computer program product of claim 1, wherein, responsive to receiving a command from more than one of the plurality of master devices that has a virtual Flash memory allocation, the commands are sequenced to ensure equal access in a timely fashion.

7. An apparatus comprising:
a processor; and
a memory Coupled to the processor, wherein the memory comprises instructions which, when executed by the processor, cause the processor to:
for each master device in a plurality of master devices;
identify an amount of Flash memory space required by the master device;
allocate the amount of Flash memory space from a Flash component to the master device as a virtual Flash memory allocation;
record an initial sector location of the virtual Flash memory allocation in a data structure as an offset into the Flash component;
record a length of the virtual Flash memory allocation in the data structure; and
load data that allows the master device to boot up into the virtual Flash memory allocation;
and wherein the instructions further cause the processor to:
receive a command from one of the plurality of master devices that has a virtual Flash memory allocation;
identify a mode of operation in which the master device is operating;
based on the identified mode of operation, determine whether the command can be executed;
responsive to a determination that the command can be executed, determine the offset associated with the virtual Flash memory allocation of the master device; and
perform the command using the offset.

8. The apparatus of claim 7, wherein the instructions further cause the processor to:
responsive to a determination that the command cannot be executed, send an error back to the master device indicating that the command cannot be performed due to the mode in which the master device is operating.

9. The apparatus of claim 7, wherein the mode of operation is a compatibility mode and wherein, in the compatibility mode, the master device is able to read from the virtual Flash memory allocation, write to the virtual Flash memory allocation, perform a sector erase only within the virtual Flash memory allocation, and obtain information as to a manufacturer of the Flash component, a type of the Flash component, and a capacity of the virtual Flash memory allocation.

10. The apparatus of claim 7, wherein the mode of operation is a single entity mode and wherein, in the single entity mode, the master device is able to read from any section of the Flash component, write to any section of the Flash component, perform a sector erase within any section of the Flash component, and obtain information as to a manufacturer of the Flash component, a type of the Flash component, and a capacity of the Flash component.

11. The apparatus of claim 7, wherein the mode of operation is a restrictive mode, wherein, in the restrictive mode, the master device is able to read from the virtual Flash memory allocation and obtain information as to a manufacturer of the Flash component, a type of the Flash component, and a capacity of the virtual Flash memory allocation, and wherein, in the restrictive mode, the master device cannot alter the virtual Flash memory allocation through a write command or a erase command.

12. The apparatus of claim 7, wherein, responsive to receiving a command from more than one of the plurality of master devices that has a virtual Flash memory allocation, the commands are sequenced to ensure equal access in a timely fashion.

* * * * *